Nov. 25, 1952     D. C. HUNGERFORD     2,618,986
HANDLE BAR GRIP
Filed March 30, 1949
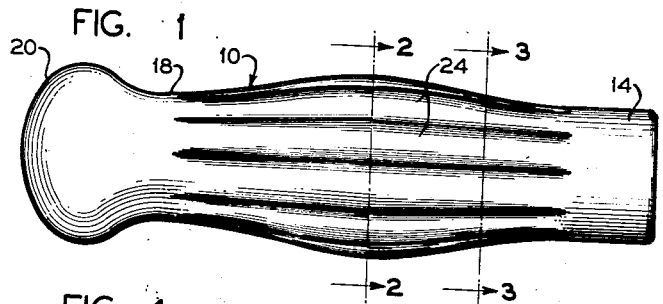
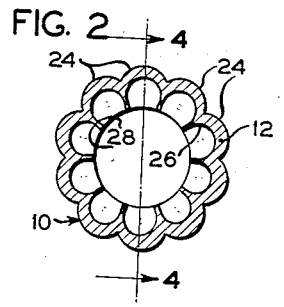
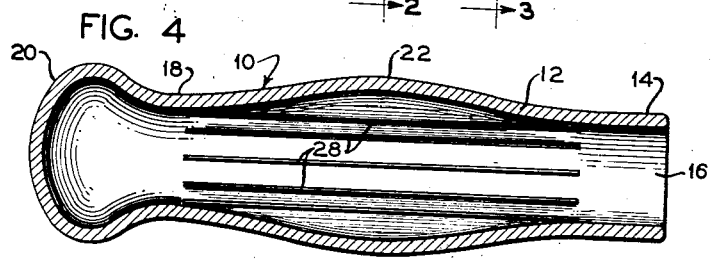
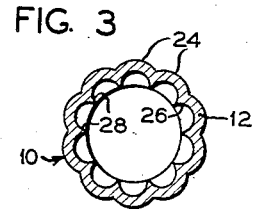
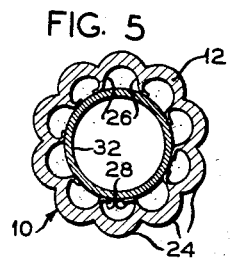
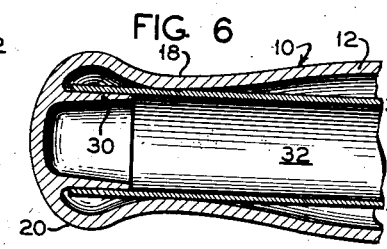
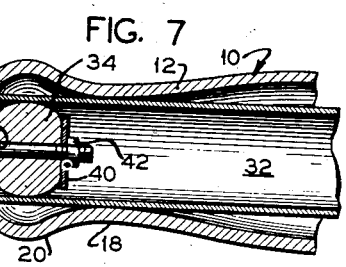
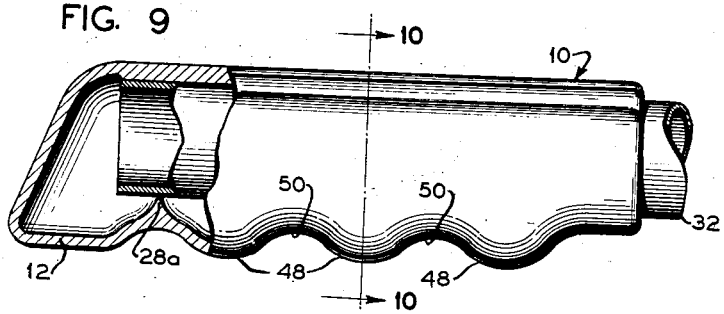
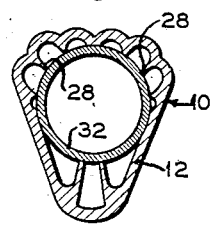
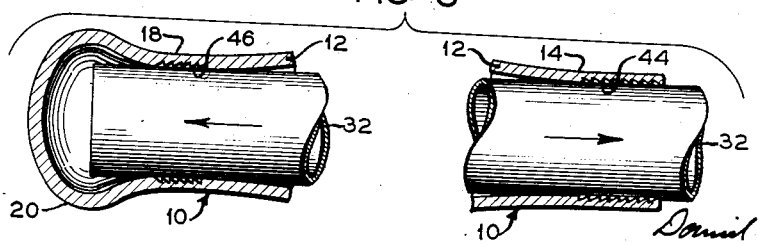
INVENTOR.
Daniel C. Hungerford
BY Jarvis C. Markley
his Attorney Patented Nov. 25, 1952

2,618,986

UNITED STATES PATENT OFFICE 2,618,986

HANDLE BAR GRIP

Daniel C. Hungerford, Madison, N. J., assignor to Hungerford Plastics Corporation, Rockaway, N. J., a corporation of New Jersey Application March 30, 1949, Serial No. 84,277

7 Claims. (Cl. 74—551.9)

The present invention relates to handle bar grips such as are used on bicycles, lawn mowers and other implements having handles required to be grasped by an operator when in use.

For many years such grips have been made from rubber or rubber compounds in the form of hollow tubular bodies open at one end and usually closed at the other and adapted to be slipped over the end of a handle bar, which is ordinarily a hollow metal tube, and to be retained in place by frictional engagement. Such grips, as heretofore and presently produced, are subject to several deficiencies among the principal ones of which are comparatively rapid deterioration and loss of elasticity upon exposure to the elements, leading frequently to the loss of the article, rubbing off of the surface layer of the material (usually black) on the hands of the operator when wet by rain or dampened with perspiration, and marking of walls and the like by rubbing off of the surface layer when the article such as a bicycle is leaned against a wall for support. Also, since in practice cost is a material factor, the quality of such articles in general use is relatively low, frequently being compounded of reworked rubber having large percentages of filler such as lamp-black incorporated therein, all of which tends to accentuate deficiencies such as those noted.

The general object of the present invention is to provide a new and improved form of grip of the kind under consideration which will not only eliminate the shortcomings of the presently available grips but which will also afford new and advantageous features hereinafter to be more fully pointed out, while at the same time being no more expensive than the present relatively inferior product. To this end the invention contemplates the production of grips in the form of molded elastic thermoplastic material which embody novel structural features as illustrated by way of example but without limitation in the accompanying drawings forming a part hereof and showing several structural forms of the invention.

In the drawings:

Fig. 1 is an elevation of a grip embodying the invention;

Fig. 2 is a section taken on the line 2—2 of Fig. 1;

Fig. 3 is a section taken on the line 3—3 of Fig. 1;

Fig. 4 is a section taken on the line 4—4 of Fig. 2;

Fig. 5 is a section similar to Fig. 2 showing a grip applied to a handle bar;

Fig. 6 is a fragmentary section similar to Fig. 4 showing a different detail of construction;

Fig. 7 is a fragmentary section similar to Fig. 6 showing still another form of construction;

Fig. 8 is a sectional view showing still another form of construction;

Fig. 9 is an elevation partly in section of another form of grip applied to a handle bar; and Fig. 10 is a section taken on the line 10—10 of Fig. 9.

Referring now more particularly to the grip shown in Figs. 1–5 the grip indicated generally at 10 consists of an integral unitary body of molded thermoplastic material. The body is generally tubular and is formed by a main wall portion 12 which in the embodiment illustrated is formed to provide a continuous cylindrical section 14 at the end of the grip provided with the opening 16. Adjacent the other end of the grip the wall 12 has a circular portion 18 and the closed end of the grip is flared to provide a bulbous end portion 20. Intermediate the portions 14 and 18 the wall of the grip is bulged to provide a central grip portion 22 of larger diameter and between the portions 14 and 18 the bulged portion is corrugated to provide a multiplicity of longitudinally extending scallops 24 which in the embodiment illustrated are of greater radial depth centrally of the grip than at the end portions of the scallops which merge into the circular portions 16 and 18. In the embodiment illustrated the wall 12 is of substantially uniform thickness and is of relatively thin section. From the base lines 26 of the scallops thin ribs 28 project radially inwardly, the radially inner edges of these ribs in the embodiment illustrated being straight lengthwise of the ribs and the ribs extending inwardly so that the inscribed diameter is the same or substantially the same as the internal diameter of the portions 16 and 18. With this arrangement it will be seen from Figs. 2 and 3 that the ribs are of maximum radial extent at the central part 22 of the handle and gradually decrease in height toward the ends of the handle until their inner edges merge with the outer wall 12.

The internal diameter of the portions 16 and 18 and the inscribed diameter of the ribs 28 is made less than the external diameter of the bar to which the grip is to be applied, the elastic nature of the material permitting it to be stretched circumferentially and as shown in Fig. 5 it will be seen that in the embodiment illustrated the ribs deflect laterally to provide additional gripping surface and also over the bulged portion of the grip to provide resilient or yielding support for the outer wall. Obviously the specific configuration of the scallops and of the rib structure may be varied to provide other specific forms for accomplishing the same general object.

In addition to the gripping action afforded by the tubular portion of the grip, further frictional contact with the bar on which the grip is mounted may be obtained by providing for grips such as that above described with an internal annular flange 30 extending axially inwardly from the end 20 to frictionally grip the inner surface of the hollow handle bar 32 on which the grip is mounted.

If still more positive attachment of the grip to the bar is desired a form of construction such as shown in Fig. 7 may be employed in which a plug 34 is formed projecting inwardly from the closed end 20 for insertion within the tubular bar 32. The plug 34 is provided with a bore 36 through which is inserted a screw 38 the projecting inner end of which carries a washer 40 and nut 42.

As will be evident from the drawing when the grip is applied to the bar and the nut advanced on the screw by turning the external head of the latter the plug will be axially compressed and radially expanded to form a frictional pressure locking grip against the bar.

Still another form of construction for frictionally anchoring the grip on a bar is shown in Fig. 8 wherein the circular portions 14 and 18 of the wall 12 are provided with annular internal serrations 44 and 46 which advantageously are of saw-tooth form with the teeth pointed outwardly toward the respective ends of the grip as indicated in Fig. 8.

The general form of construction contemplated may also be readily applied in making other specific forms of grip and by way of example there is shown in Figs. 9 and 10 a form in which the main wall 12 of the grip is provided on its underside with a series of transversely extending corrugations 48 providing between them finger grip recesses 50. As will be evident from the figures the cross section of the wall 12 is non-circular and the internal ribbing is different at different parts of the grip, the longitudinal extending ribs being extended only partially around the circumference of the grip which is only partially fluted. In this embodiment the bulging of the grip is omitted so that the ribs 28 are of substantially uniform radial extent over their entire length, joining at their ends the circular end portions 14 and 18.

On the under or finger grip side longitudinally extending ribs may be provided or as shown in Fig. 9 the ribs may be interrupted longitudinally to provide a series of rib-like projections 28a.

As will be observed from the foregoing the construction provides a grip having relatively little material while at the same time providing a structure which will firmly grip a bar or the like and which moreover can readily be molded to provide an integral one-piece article when made from material of the kind contemplated by the present invention.

Insofar as the present invention is concerned numerous thermoplastic materials are available which will produce satisfactory results.

I have found from practical experience, however, that a most satisfactory material is a thermoplastic compounded with a vinyl resin base of which the formulation given below by way of example but without limitation is very suitable.

|  | Parts by weight |
|---|---|
| Vinyl resin | 54 |
| Filler | 10 |
| Plasticizer | 33.3 |
| Stabilizer | 2 |
| Lubricant | 0.7 |

In the above formulation the resin may be selected from the class consisting of polyvinyl chloride and polyvinyl chloride-acetate copolymer. The filler may be a product known as Whitex (magnesium silicate or calcium carbonate). A preferred plasticizer is dioctyl sebacate, suitable alternatives being dioctyl adipate, trioctyl phosphate and dibutyl sebacate. The stabilizer may be lead stearate or carbonate, barium stearate or the equivalent. The lubricant, which is employed principally to aid in molding, may for example be a castor oil derivative or calcium stearate.

A formulation such as the above provides the required properties and particularly affords the desired property of remaining relatively soft and flexible at low temperatures. Also such a formulation provides stability for color if a colored article is desired, it being necessary to add only a small quantity of suitable colorant to the above formulation in order to secure a homogeneously colored article.

In some instances where low cost is a paramount factor and a black article is acceptable a suitable formulation is as follows:

|  | Parts by weight |
|---|---|
| Vinyl resin | 29.5 |
| Filler | 19 |
| Plasticizer | 29 |
| Stabilizer | 2.3 |
| Lubricant | 0.7 |
| Carbon black | 19.5 |

In the above formulation the several ingredients may be of the nature previously indicated except that a less expensive plasticizer such as a mixture of trioctyl phosphate and a petroleum derivative such as Solvaloid may be employed.

The difference between the formulations above given is that the latter is not so color stable as the former and is less soft and pliable at low temperatures. Both, however, provide the required resilience and have the characteristic of plastic memory which enables articles of the form hereinbefore described readily to be molded by known injection molding methods, since after molding if the article is stripped from the mold before cooling to normal temperature the distortion required to strip it will be eliminated by the automatic action of the material returning to its molded form.

From the foregoing it will be evident that within the scope of the invention many different specific configurations of grip may be made and different specific formulations of materials may be employed. The invention is accordingly to be understood as embracing all articles falling within the scope of the appended claims.

What I claim:

1. A hand grip for handle bars comprising a tubular hand grip member made of a plastic material selected from the class consisting of polyvinyl chloride and polyvinyl chloride-acetate copolymer.

2. A grip as defined in claim 1 in which the material consists of polyvinyl chloride.

3. A grip as defined in claim 1 in which the material consists of polyvinyl chloride-acetate copolymer.

4. A grip for handle bars comprising a unitary body of a plastic material of the class consisting of polyvinyl chloride and polyvinyl chloride-acetate copolymer, said body having a tubular portion open at one end, said tubular portion having a relatively thin wall and including an outwardly bulged intermediate part, and projections extending radially inwardly from and lengthwise of the bulged part adapted to yieldably engage the bar to which the grip is attached.

5. A grip as defined in claim 4 in which the wall of said tubular portion is of substantially uniform wall thickness.

6. A grip for handle bars comprising a unitary molded body of a plastic material of the class consisting of polyvinyl chloride and polyvinyl chloride-acetate copolymer, said body having a tubular portion open at one end, said tubular portion having a relatively thin wall of substantially uniform wall thickness and including an intermediate part one portion of the periphery of which is provided with longitudinally extending projections extending radially inwardly and adapted to yieldably engage the bar to which the grip is attached and another portion of the periphery of which is formed to provide a plurality of transversely extending corrugations providing finger grips for the fingers of the user.

7. In combination with a handle bar, a hand grip element, said handle bar comprising a metallic member having a smooth outer surface, said hand grip element comprising a tubular plastic element telescoped over the end of the bar and arranged to frictionally grip said smooth surface, said plastic element being made from a plastic selected from the class consisting of polyvinyl chloride and polyvinyl chloride-acetate copolymer.

DANIEL C. HUNGERFORD.

REFERENCES CITED

The following references are of record in the file of this patent:

UNITED STATES PATENTS

| Number | Name | Date |
|---|---|---|
| 476,424 | Smith | June 7, 1892 |
| 652,981 | Pratt | July 3, 1900 |
| 1,295,627 | Sommer | Feb. 25, 1919 |
| 1,421,098 | Phillips | June 27, 1922 |
| 1,565,076 | Fink | Dec. 8, 1925 |
| 2,466,719 | MacKearin | Apr. 12, 1949 |

FOREIGN PATENTS

| Number | Country | Date |
|---|---|---|
| 11,306 | Great Britain | July 3, 1891 |
| 348,981 | Great Britain | May 21, 1931 |